US012730546B2

(12) United States Patent
Komiyama et al.

(10) Patent No.: US 12,730,546 B2
(45) Date of Patent: Sep. 8, 2026

(54) DISPLAY CONTROL METHOD, DISPLAY CONTROL APPARATUS, INFORMATION PROCESSING APPARATUS, INFORMATION PROCESSING SYSTEM, AND STORAGE MEDIUM

(71) Applicant: CASIO COMPUTER CO., LTD., Tokyo (JP)

(72) Inventors: Noritaka Komiyama, Tokyo (JP); Yoshihiro Takayama, Tokyo (JP); Masaki Ito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 245 days.

(21) Appl. No.: 18/612,353

(22) Filed: Mar. 21, 2024

(65) Prior Publication Data

US 2024/0319846 A1 Sep. 26, 2024

(30) Foreign Application Priority Data

Mar. 24, 2023 (JP) ................................ 2023-048197

(51) Int. Cl.

| | |
|---|---|
| ***G06F 3/048*** | (2013.01) |
| ***G06F 3/01*** | (2006.01) |
| ***G06F 3/0482*** | (2013.01) |
| ***G06Q 30/0601*** | (2023.01) |

(52) U.S. Cl.

CPC ............ *G06F 3/0482* (2013.01); *G06F 3/011* (2013.01); *G06Q 30/0641* (2013.01)

(58) Field of Classification Search

None

See application file for complete search history.

(56) References Cited

U.S. PATENT DOCUMENTS 8,478,662 B1 * 7/2013 Snodgrass ............ G06F 16/335 705/26.7
11,200,740 B1 * 12/2021 Samuel ................ G06F 3/0485
12,475,506 B1 * 11/2025 Cirillo ............... G06Q 30/0641

(Continued)

FOREIGN PATENT DOCUMENTS

JP 2019046108 A 3/2019
JP 2020184124 A 11/2020

(Continued)

*Primary Examiner* — Thanh T Vu

(74) *Attorney, Agent, or Firm* — Scully, Scott, Murphy & Presser, P.C.

(57) ABSTRACT

There is provided a display control method that is performed by at least one processor of a computer including a memory storing a program that is executed by the processor. The display control method includes: determining, in accordance with a predetermined rule, from among a plurality of images (i) each associated with detailed information to be presented to a user and (ii) arranged and displayed on a list screen, a target image for which supplementary information included in the detailed information is to be displayed; causing a display to display the list screen where the plurality of images is arranged; and causing the display to display, at a position on the list screen, the supplementary information having a content related to the detailed information associated with the target image, the position corresponding to the target image.

17 Claims, 13 Drawing Sheets

(56) References Cited

U.S. PATENT DOCUMENTS

2010/0131455 A1* 5/2010 Logan ................ G06F 16/9577
707/602
2012/0191577 A1* 7/2012 Gonsalves ......... G06Q 30/0643
705/27.2
2015/0058180 A1* 2/2015 Nations ............. G06Q 30/0282
705/27.2

FOREIGN PATENT DOCUMENTS

JP 2021071802 A 5/2021
WO 2015059836 A1 4/2015

* cited by examiner

| USER ID | U0001 | U0002 | … |
|---|---|---|---|
| AGE GROUP | 20s | 30s | … |
| GENDER | F | M | … |
| RESIDENTIAL AREA | JAPAN | U.S.A. | … |
| VIEWING RECORD 1 | M0002 | A0031 | … |
| VIEWING RECORD 2 | X0091 | M0001 | … |
| : | : | : | … |
| MY WATCH | X0091 | M0003 | … |
| : | : | : | : |

| MODEL NUMBER | | X0091 | X0092 | X0093 | … |
|---|---|---|---|---|---|
| SERIES | | X | X | X | … |
| COLOR | | BK/B/R/W | BK/B/R | BK/B/R/W | … |
| YEAR OF RELEASE | | 2022 | 2022 | 2022 | … |
| PRODUCT IMAGE | | ¥image¥seriesx¥… | ¥image¥seriesx¥… | ¥image¥seriesx¥… | … |
| SUPPLEMENTARY INFORMATION | A: RANKING INFORMATION | NO. 4 IN NUMBER OF VIEWS (20s) | – | NO. 1 IN NUMBER OF LIKES (SERIES X) | … |
| | B: PICKUP | MODEL WORN IN MOVIE XX | – | MODEL WITH SUBMARINE AS MOTIF | … |
| | C: NUMBER OF MY WATCH REGISTRATIONS | 931 | 541 | 1584 | … |
| | D: DESCRIPTION | .......... | .......... | .......... | … |
| : | | : | : | : | : |

Ib Ib Ib Ib

| RANK | NUMBER OF LIKES | | | | | | | NUMBER OF VIEWS | | | |
|---|---|---|---|---|---|---|---|---|---|---|---|
| | ALL MODELS | 10s | … | JAPAN | … | SERIES X | … | ALL MODELS | 10s | … | … |
| 1 | M0001 | A0031 | … | M0001 | … | X0093 | … | M0001 | A0031 | … | … |
| 2 | A0031 | M0001 | … | M0002 | … | X0081 | … | A0031 | M0001 | … | … |
| 3 | M0002 | X0091 | … | A0031 | … | X0082 | … | X0093 | M0002 | … | … |
| : | : | : | : | : | : | : | : | : | : | : | : |

32

321
SERIES X
10:58 12
2022
40
40
40A
L
X0091
X0092
X0093
S
52
NO. 1 IN NUMBER OF LIKES (SERIES X)
50
51
40
40
L
X0094
X0095
10:58 12
S
2021
40A
40
40
L
X0081
X0082
X0083
S
BESTSELLING MODEL OF 2021
51
50

| TYPE OF SUPPLEMENTARY INFORMATION | PRIORITY | WEIGHT |
|---|---|---|
| A: RANKING INFORMATION | 1 | 3.0 |
| B: PICKUP | 2 | 1.5 |
| C: NUMBER OF MY WATCH REGISTRATIONS | 3 | 1.0 |
| D: DESCRIPTION | 4 | 0.5 |

32a
L
L
L
L
L
L
A
B
B
A
B
B
40a
40a
40
40a 32a
32a
L1
L1
L1
L2
L2
L1
L1
L2
L1
L1
L1
L2
L1
L2
L2
L1
L2
L2
L1
L2

DISPLAY CONTROL METHOD, DISPLAY CONTROL APPARATUS, INFORMATION PROCESSING APPARATUS, INFORMATION PROCESSING SYSTEM, AND STORAGE MEDIUM

REFERENCE TO RELATED APPLICATIONS

This application is based upon and claims the benefit of priority from the prior Japanese Patent Application No. 2023-048197, filed on Mar. 24, 2023, the entire content of which is incorporated herein by reference.

TECHNICAL FIELD

The present disclosure relates to a display control method, a display control apparatus, an apparatus, an information information processing processing system, and a storage medium.

DESCRIPTION OF RELATED ART

In WO 2015/059836 A1, there is disclosed a display control method of arranging and displaying, on a list screen, images of items (e.g., products) registered in a database, and when a user operation to select one of the images is made, displaying detailed information on the item of the selected image.

SUMMARY OF THE INVENTION

According to an aspect of the present disclosure, there is provided a display control method that is performed by at least one processor of a computer including a memory storing a program that is executed by the processor, including:

(a) determining, in accordance with a predetermined rule, from among a plurality of images (i) each associated with detailed information to be presented to a user and (ii) arranged and displayed on a list screen, a target image for which supplementary information included in the detailed information is to be displayed;

(b) causing a display to display the list screen where the plurality of images is arranged; and (c) causing the display to display, at a position on the list screen, the supplementary information having a content related to the detailed information associated with the target image, the position corresponding to the target image.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein:

FIG. 3 shows an example of the contents of a user information DB;

FIG. 4 shows an example of the contents of a model DB;

DETAILED DESCRIPTION

Hereinafter, one or more embodiments of the present disclosure will be described with reference to the drawings.

[Configuration of Information Processing System]

Figure 1:
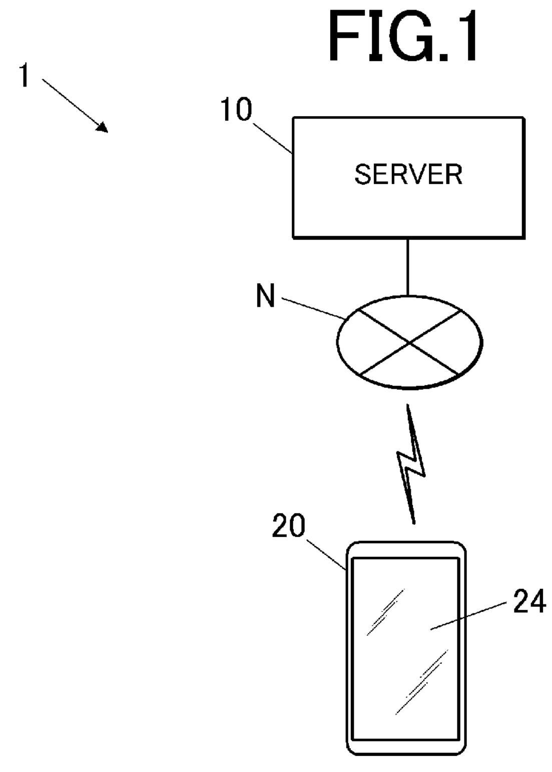
FIG. 1 shows the configuration of an information processing system.

FIG. 1 shows the configuration of an information processing system 1 according to an embodiment of the present disclosure. The information processing system 1 includes a server 10 (information processing apparatus) and a terminal apparatus 20 (display control apparatus). The server 10 is connected to the terminal apparatus 20 via a network N to perform data communication. The network N is not limited to but the Internet. Users of the information processing system 1 each use one terminal apparatus 20. The information processing system 1 may include a plurality of terminal apparatuses 20 used by a plurality of users. The terminal apparatus 20 of this embodiment is not limited to but a smartphone. The terminal apparatus 20 may be a smartwatch, a tablet terminal or a laptop personal computer (PC), for example.

By executing a predetermined application program (hereinafter referred to as an "application 231" (shown in FIG. 6)) on the terminal apparatus 20, the user of the terminal apparatus 20 can view information on products registered in a product information DB 133 (predetermined database) (shown in FIG. 2) of the server 10 or buy these products. In this embodiment, the products are wristwatches.

Figure 2:
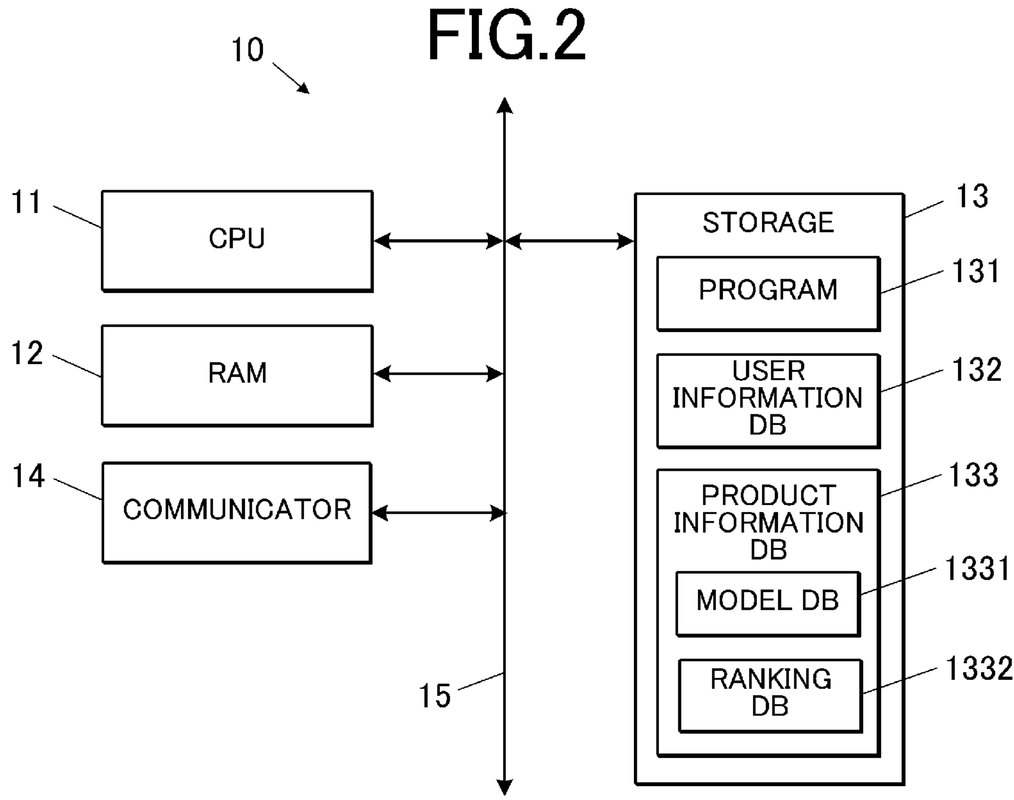
FIG. 2 is a block diagram showing a functional configuration of a server.

FIG. 2 is a block diagram showing a functional configuration of the server 10. The server 10 includes a central processing unit (CPU) 11 (at least one processor), a random access memory (RAM) 12, a storage 13 (memory), a communicator 14 and a bus 15. These components of the server 10 are connected to one another via the bus 15. The server 10 may further include an operation receiver and a display used by an administrator of the server 10.

The CPU 11 is a processor that reads and executes programs 131 stored in the storage 13 and performs various types of arithmetic processing, thereby controlling the operation of each component of the server 10. The server 10 may have a plurality of processors (e.g., CPUs), and these processors may perform a plurality of processes that the CPU 11 of this embodiment performs. In this case, the processors may be involved in the same process (es) or may independently perform different processes in parallel.

The RAM 12 provides a working memory space for the CPU 11 and stores temporary data.

The storage 13 is a non-transitory storage medium readable by the CPU 11 and stores the programs 131 and various data. The storage 13 includes a nonvolatile memory, such as a hard disk drive (HDD) or a solid state drive (SSD). The data stored in the storage 13 includes a user information DB 132 and the abovementioned product information DB 133. In the product Information DB 133, information on a plurality of wristwatch models (a plurality of items) is registered. The product information DB 133 includes a model DB 1331 and a ranking DB 1332.

FIG. 3 shows an example of the contents of the user information DB 132. One column data in the user information 132 includes (a piece Ia of) user information Ia on one user. In the user information DB 132, (pieces Ia of) the user information Ia on all users who utilize the information processing system 1 is registered. The user information Ia includes data of "User ID", "Age Group", "Gender", "Residential Area", "Viewing Record 1", "Viewing Record 2" and "My Watch". Of these, the "User ID", "Age Group", "Gender" and "Residential Area" each correspond to an attribute of each user (user attribute). Information on these attributes of a user is, for example, input by the user on the terminal apparatus 20 and transmitted from the terminal apparatus 20 to the server 10 to be registered in the user information DB 132.

The "User ID" is a unique code assigned to each user.

The "Age Group" indicates an age group (10s, 20s, etc.) to which the user's age belongs.

The "Gender" indicates the gender of the user.

The "Residential Area" indicates a region (country in this embodiment) where the user lives.

The "Viewing Record 1", "Viewing Record 2", etc. each indicate a model viewed by the user on the application 231.

The "My Watch" indicates a model owned by the user. For example, when the user makes an operation to select an own button 344 on a model screen 34 (shown in FIG. 11) described below, the operation information is transmitted to the server 10 so that the data is registered in the "My Watch" in the user information DB 132.

The information included in the user information DB 132 is not limited to those shown in FIG. 3 and may include information on models that each user has marked/registered as likes (favorite registrations).

FIG. 4 shows an example of the contents of the model DB 1331. One column data in the model DB 1331 includes (a piece Ib of) model information Ib (item information) on one wristwatch model. In the model DB 1331, (pieces Ib of) the model information Ib on all wristwatch models purchasable by the user at the time and all wristwatch models that were released and purchasable in the past is registered. The model information Ib includes data of "Model Number", "Series", "Color", "Year of Release", "Product Image" and "Supplementary Information". Of these, the "Model Number", "Series", "Color" and "Year of Release" each correspond to an attribute of each wristwatch model (model attribute). The information included in the model DB 1331 is not limited to those shown in FIG. 4 and may include information on specifications of each model.

The "Model Number" is a unique code assigned to each model. Hereinafter, wristwatch models may be referred to as "model X0093" and so forth, using their respective model numbers.

The "Series" indicates a product series (product group) to which the model belongs. Each product series is constituted of a plurality of models having a shared or similar characteristic (s)/feature (s).

The "Color" indicates a color (s) available (set) for the model.

The "Year of Release" indicates a year in which the model was released.

The "Product Image" indicates a file path for a product image 40 (shown in FIG. 8, etc.) showing the external appearance of the model. The model DB 1331 includes image data of the product image 40 stored in a directory indicated by the file path.

The "Supplementary Information" is information indicating characteristics of the model in short, and registered in a state of being associated with the model in advance. In this embodiment, for each model, at least one of four types of supplementary information is registered. The four types of the supplementary information are "A: Ranking Information", "B: Pickup", "C: Number of My Watch Registrations" and "D: Description", which hereinafter may be referred to as "A", "B", "C" and "D", respectively. On a list screen 32 (shown in FIG. 8) described below, one type of supplementary information 51 determined from "A" to "D" may be displayed at a position adjacent to its corresponding product image 40.

The "A: Ranking Information" is information extracted from ranking information Ic (statistical information) (shown in FIG. 5) in the ranking DB 1332 described below, the piece 51 in which a model ranks high (e.g., in the top 10, top 3, etc.). For example, as shown in FIG. 4, model X0091 ranks fourth in the number of views by users in their 20s, and this information is registered in/as "A". Also, as shown in FIG. 4, model X0093 ranks first in the number of likes (number of favorite registrations) with a series X as a population, and this information is registered in/as "A". If a model ranks high in a plurality of pieces Ic of the ranking information Ic, information on all the pieces Ic of the ranking information Ic may be registered in/as "A", and one of these may be selected at a certain stage. The "A: Ranking Information" corresponds to "supplementary information having a content related to statistical information".

The "B: Pickup" is a short text that includes information such as characteristic specifications or unique episodes about a model. In/As "B", the following may be registered: information on the specifications of a model, such as "First Model Equipped with Solar Panel"; information on the production of a model, such as "Model of Only 500 Units Produced"; information on the sales of a model, such as "Bestselling Model of 2022"; information on the background of development of a model, such as "Model with Submarine as Motif"; and a unique topic about a model, such as "Model Worn in Movie XX". The "B: Pickup" corresponds to "supplementary information having a content related to item information".

The "C: Number of My Watch Registrations" indicates the number of users who have marked/registered a model as "My Watch". The "C: Number of My Watch Registrations" corresponds to the "supplementary information having a content related to statistical information".

The "D: Description" is a text that describes characteristics of a model in detail. The "D: Description" corresponds to the "supplementary information having a content related to item information".

The types of the supplementary information 51 are not limited to "A" to "D" described above and may be changed as appropriate.

Figure 5:
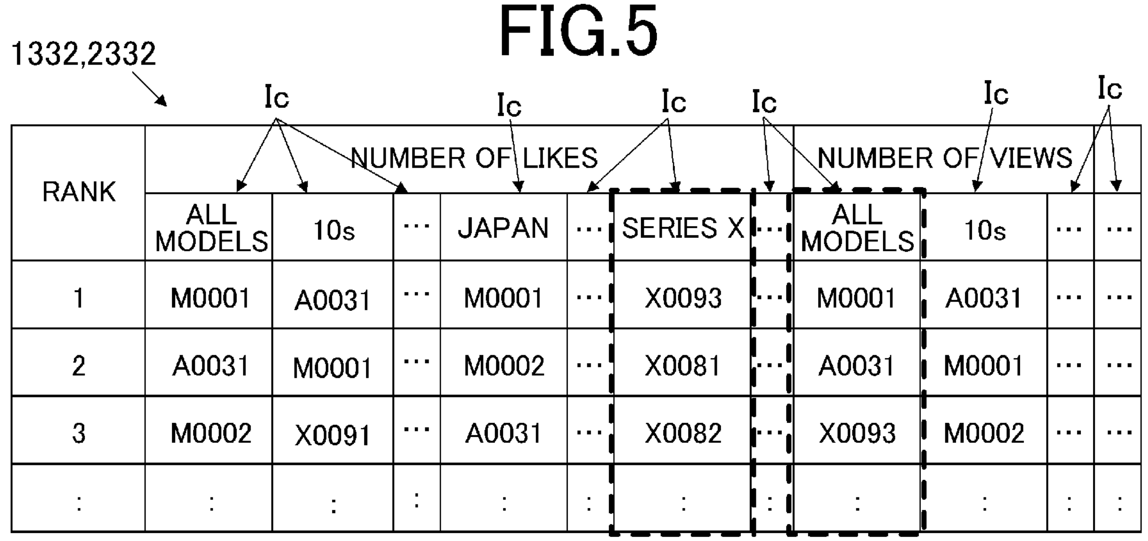
FIG. 5 shows an example of the contents of a ranking DB.

FIG. 5 shows an example of the contents of the ranking DB 1332. One column data in the ranking DB 1332 includes (a piece Ic of) the ranking information Ic of wristwatch models generated on the basis of a statistical indicator. The ranking DB 1332 includes a plurality of pieces Ic of the ranking information Ic different from one another in population and/or statistical indicator.

The population of each piece Ic of the ranking information Ic may be all models registered in the product information DB 133 or may be some models extracted therefrom in accordance with an attribute of a model. Examples of some models constituting the population include models belonging to a certain series, models available in a certain color, and models released in a certain year.

Examples of the statistical indicator based on which the ranking information Ic is generated include the number of likes, a rapid increase in the number of likes, the number of views, a rapid increase in the number of views, the number of My Watch registrations and the number of units sold. The number of likes indicates the number of users who have marked a model as a like. The rapid increase in the number of likes indicates the number of users who have marked a model as a like in the most recent specific period. The number of views indicates the number of users who have viewed information on a model. The rapid increase in the number of views indicates the number of users who have viewed information on a model in the most recent specific period. These statistical indicators may be combined with the user attributes (age, gender, residential area, etc.). Examples thereof include a rapid increase in the number of likes by users in their 20s.

The contents of the ranking DB 1332 are updated at a predetermined frequency (e.g., once a day) on the basis of information transmitted from each user's terminal apparatus 20. Examples of the information include favorite registrations, My Watch registrations, viewing records and the sales state of each model.

Thus, in the product information DB 133, detailed information to be presented to users is registered in the state of being associated with each wristwatch model (each item). The detailed information associated with a model includes the model information Ib on the model and the ranking information Ic in which the model ranks. In other words, the detailed information including the model information Ib and the ranking information Ic is associated with a product image 40 of each wristwatch model. For example, the detailed information associated with the model X0093 in the examples shown in FIG. 4 and FIG. 5 include one piece Ib of the model information Ib on the model X0093 enclosed by a dashed line among a plurality of column data in the model DB 1331 shown in FIG. 4 and two pieces Ic of the ranking information Ic in which the model X0093 ranks high enclosed by dashed lines among a plurality of column data in the ranking DB 1332 shown in FIG. 5. The contents of the detailed information are not limited to the above and may include only one of the model information Ib and the ranking information Ic, for example.

Returning to FIG. 2, the communicator 14 performs communication in accordance with a predetermined communication standard. The communicator 14 performs the communication to transmit and receive data to and from the terminal apparatus 20 via the network N.

Figure 6:
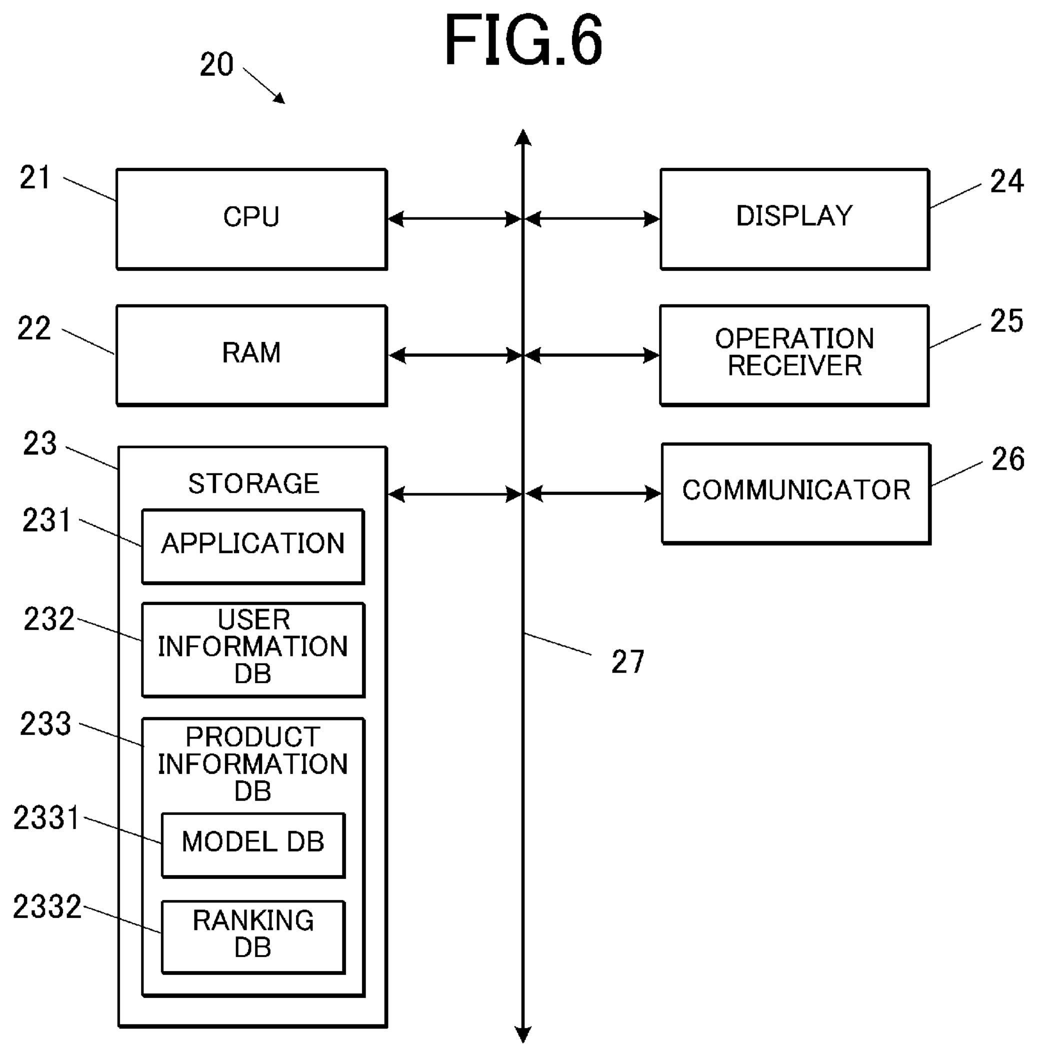
FIG. 6 is a block diagram showing a functional configuration of a terminal apparatus.

FIG. 6 is a block diagram showing a functional configuration of the terminal apparatus 20. The terminal apparatus 20 includes a CPU 21 (at least one processor), a RAM 22, a storage 23 (memory), a display 24, an operation receiver 25, a communicator 26 and a bus 27. These components of the terminal apparatus 20 are connected to one another via the bus 27.

The CPU 21 is a processor that reads and executes the application 231 and other programs stored in the storage 23 and performs various types of arithmetic processing, thereby controlling the operation of each component of the terminal apparatus 20. The terminal apparatus 20 may include a plurality of processors (e.g., CPUs), and these processors may perform a plurality of processes that the CPU 21 of this embodiment performs. In this case, the processors may be involved in the same process (es) or may independently perform different processes in parallel.

The RAM 22 provides a working memory space for the CPU 21 and stores temporary data.

The storage 23 is a non-transitory storage medium readable by the CPU 21 and stores the programs including the application 231 and various data. The storage 23 includes a nonvolatile memory, such as a flash memory. The programs are stored in the storage 23 in the form of a computer-readable program code. The data stored in the storage 23 includes a user information DB 232 and a product information DB 233.

The user information DB 232 is obtained from the user information DB 132 of the server 10 via the network N at a predetermined timing. The user information DB 232 may include only the user information Ia on the user of the terminal apparatus 20 registered in the user information DB 132.

The product information DB 233 is obtained from the product information DB 133 of the server 10 via the network N at a predetermined timing. The product information DB 233 includes a model DB 2331 corresponding to (e.g., having the same contents as) the model DB 1331 and a ranking DB 2332 corresponding to the ranking DB 1332.

The display 24 displays various screens and so forth of the application 231 under the control of the CPU 21. The display 24 is not limited to but a liquid crystal display device that performs display with a dot matrix system, for example.

The operation receiver 25 receives user input operations and outputs, to the CPU 21, input signals corresponding to the input operations. The operation receiver 25 includes a touchscreen superimposed on the display screen of the display 24, and detects contacts of fingers of the user or the like on the touchscreen as input operations. The operation receiver 25 may include hardware buttons in addition to or instead of the touchscreen and receive input operations made on the hardware buttons.

The communicator 26 performs communication in accordance with a predetermined communication standard. The communicator 26 performs the communication to transmit and receive data to and from the server 10 via the network N.

[Operation of Information Processing System]

Next, the operation of the information processing system 1, display of information performed when the application 231 is executed on the terminal apparatus 20 in particular, will be described.

When a user operation to start the application 231 is made on the operation receiver 25 of the terminal apparatus 20, a home screen 31 of the application 231 is displayed by/on the display 24.

Figure 7:
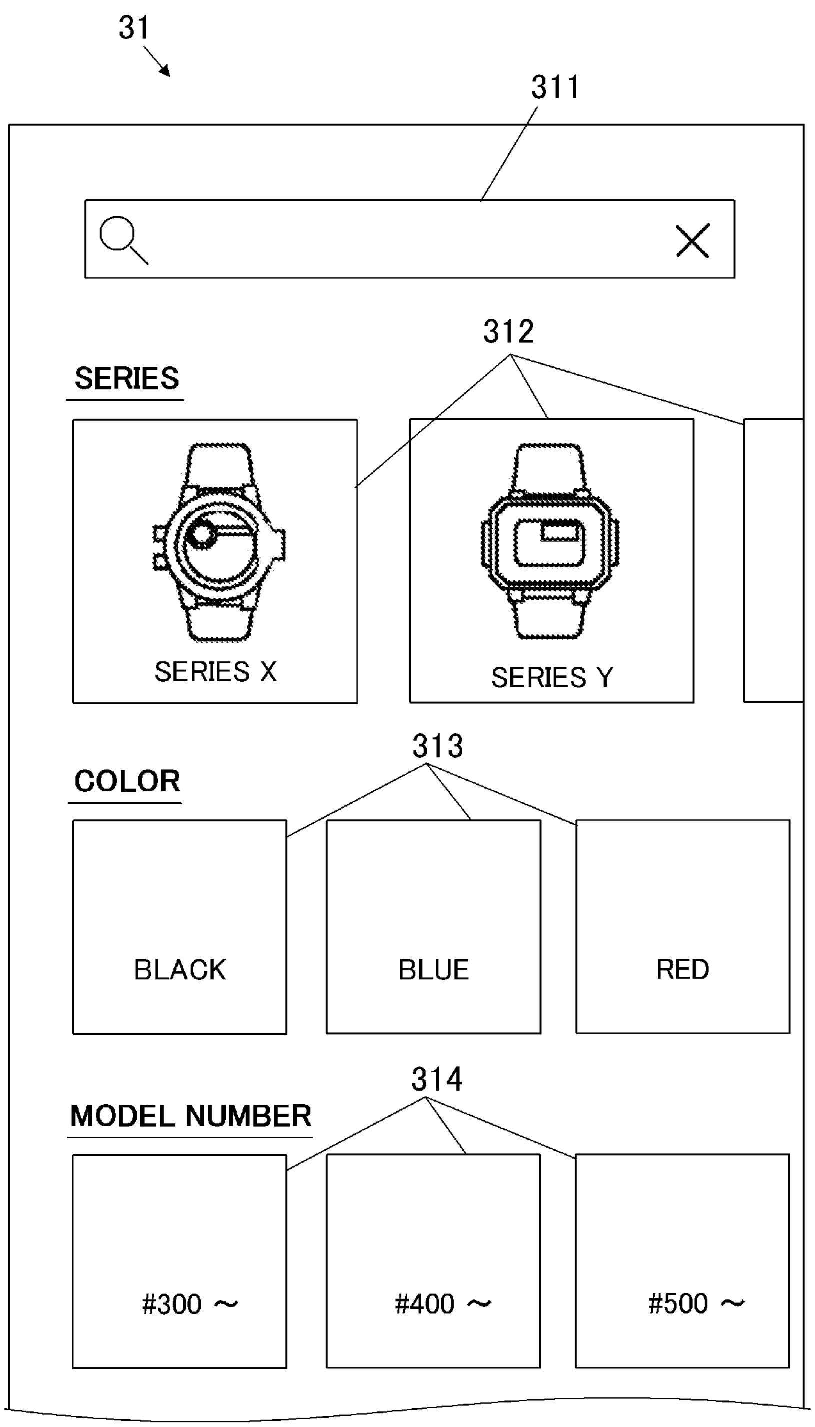
FIG. 7 shows a home screen.

FIG. 7 shows the home screen 31. On the home screen 31, a search box 311, series images 312, color images 313, model number images 314 and so forth are displayed.

A search with a desired search word (s) input in the search box 311 can change the home screen 31 to the model screen 34 (shown in FIG. 11) for a wristwatch model related to the search word.

The series images 312 each indicate a series of wristwatch models. A user operation to select one of the series images 312 can change the home screen 31 to the list screen 32 (shown in FIG. 8) for models of the selected series.

The color images 313 each indicate a color of wristwatch models. A user operation to select one of the color images 313 can change the home screen 31 to a not-shown list screen for models available in the selected color.

The model number images 314 each indicate a group of model numbers of wristwatch models. A user operation to select one of the model number images 314 can change the home screen 31 to a not-shown list screen for models belonging the selected group of model numbers.

Figure 8:
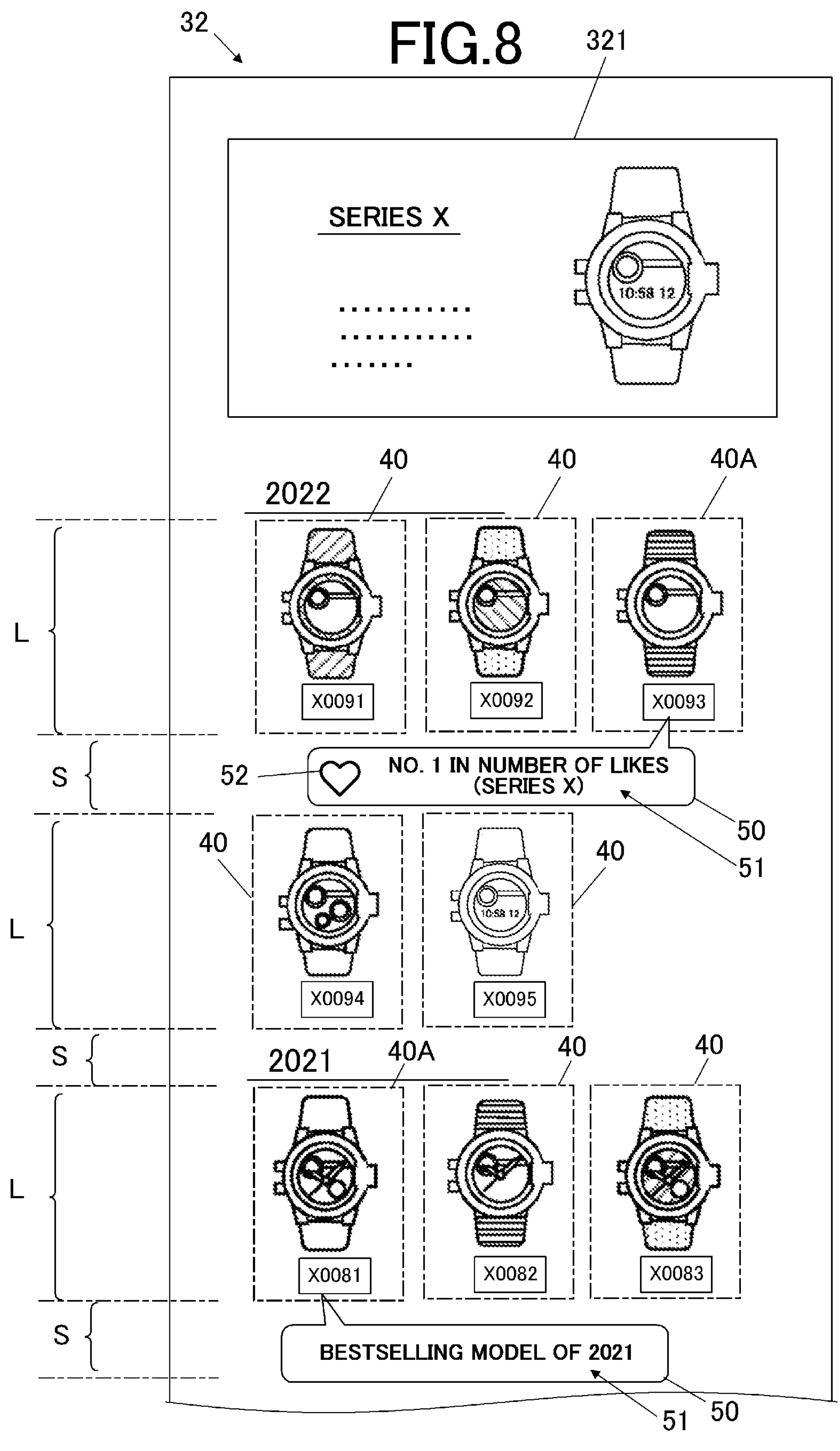
FIG. 8 shows a list screen.

FIG. 8 shows the list screen 32. On the list screen 32, a representative model display area 321, a plurality of product images 40 (a plurality of images), (pieces 51 of) the supplementary information 51 and so forth are displayed.

In the representative model display area 321, an image of the external appearance of a model that is representative of a series of wristwatch models, a description of the model and so forth are displayed.

Under the representative model display area 321, the plurality of product images 40 of wristwatch models belonging to the series are arranged and displayed. The product images 40 each are not limited to but include an image of the external appearance of a wristwatch and a model number. The product images 40 each may not include a model number. The plurality of product images 40 is arranged to form a plurality of rows L. In this embodiment, the plurality of product images 40 is arranged in a grid-like fashion (to form a matrix), but not limited thereto. The product images 40 may not be arranged in lines in the vertical direction (top-bottom direction). In this embodiment, the maximum number of product images 40 arranged in one row L is three, but not limited thereto. The maximum number thereof may be two or less or four or more. The plurality of product images 40 is arranged in a predetermined order (in the order of year of release in FIG. 8). In FIG. 8, five models released in 2022 are arranged in the first row and the second row, and three models released in 2021 are arranged in the third row. The arrangement of the product images 40 is set to form several more rows L in the downward direction of FIG. 8. A user swipe operation upward/downward in FIG. 8 can scroll the screen up/down to display product images 40 not displayed on the screen in FIG. 8.

The rows L are spaced at regular intervals in the vertical direction. In interlinear areas S between adjacent rows L, which are adjacent to one another, pieces 51 of the supplementary information 51 for some product images 40 are displayed. In FIG. 8, in the interlinear area S under the first row L, the supplementary information 51 for the product image 40 of the model X0093 in the first row L is displayed. In addition, in the interlinear area S under the third row L, the supplementary information 51 for the product image 40 of the model X0081 in the third row L is displayed. The supplementary information 51 for a product image 40 is extracted from the model information Ib on its corresponding model registered in the model DB 2331 shown in FIG. 4, and is displayed in a balloon-shaped supplementary image 50 pointing the product image 40. Thus, the supplementary image 50 includes the supplementary information 51.

In FIG. 8, in the interlinear areas S, pieces 51 of the supplementary information 51 are displayed at positions adjacent to their respective target images 40A, which will be described below. However, the display positions of the pieces 51 of the supplementary information 51 are not limited thereto and may be any positions as far as they correspond to their respective target images 40A. For example, the supplementary information 51 may be displayed at a position oblique to its corresponding target image 40A.

In FIG. 8, the width in the screen's vertical direction of the interlinear area S where the supplementary information 51 is displayed and that of the interlinear area S where the supplementary information 51 is not displayed are the same. The product images 40 are two-dimensionally and regularly arranged. This may give the user impression that the display on the screen is organized and, by extension, let the user feel that the product images 40 are easy to view.

The width of the interlinear area S where the supplementary information 51 is not displayed may be made less than that of the interlinear area S where the supplementary information 51 is displayed. In this case, the interlinear area S where the supplementary information 51 is not displayed is narrower, and accordingly all the product images 40 can be viewed with a smaller amount of scrolling. This can provide excellent-perspicuity display specifications. Further, since the supplementary information 51 is displayed in the interlinear area S the width in the screen's vertical direction of which is great, it is easier for the user to find the supplementary information 51.

Among the plurality of product images 40, product images 40 for which the supplementary information 51 is displayed are the target images 40A. The ratio of the target images 40A to the plurality of product images 40 included in the list screen 32 (which includes the area to be displayed by scrolling) is determined to be equal to or less than a reference ratio of less than 1. Although details will be described below, in this embodiment, because the target images 40A are determined such that the maximum number of the target images 40A among three product images 40 arrangeable per row L is one, and the rows L for which the supplementary information 51 is displayed are not consecutive rows L, the reference ratio is $(1/3)\times(1/2)=1/6$. In FIG. 8, the product images 40 of the models X0093, X0081 are the target images 40A. The target images 40A are determined from the plurality of product images 40 in accordance with a predetermined rule (s). Determining the target images 40A can be rephrased as determining items (i.e., wristwatch models) registered in the product information DB 133, the items corresponding to the target images 40A. The method of determining the target image (s) 40A will be described below.

The supplementary information 51 for the product image 40 (target image 40A) of the model X0093 in FIG. 8 is "No. 1 in Number of Likes (Series X)". An icon 52 indicating the statistical indicator (the number of likes) is displayed in the supplementary image 50 together with the supplementary information 51. This supplementary information 51 corresponds to the "A: Ranking Information" among the four types of the supplementary information. The supplementary information 51 for the product image 40 (target image 40A) of the model X0081 corresponds to the "B: Pickup" among the four types of the supplementary information. The contents of the supplementary information 51 displayed on the list screen 32 are determined from the four types of the supplementary information in accordance with a predetermined rule (s). The method of determining the type of the supplementary information 51 to be displayed will be described below.

FIG. 8 shows the list screen 32 scrollable in the vertical direction, but the list screen 32 is not limited thereto and may be scrollable in the horizontal direction (right-left direction).

Figure 9:
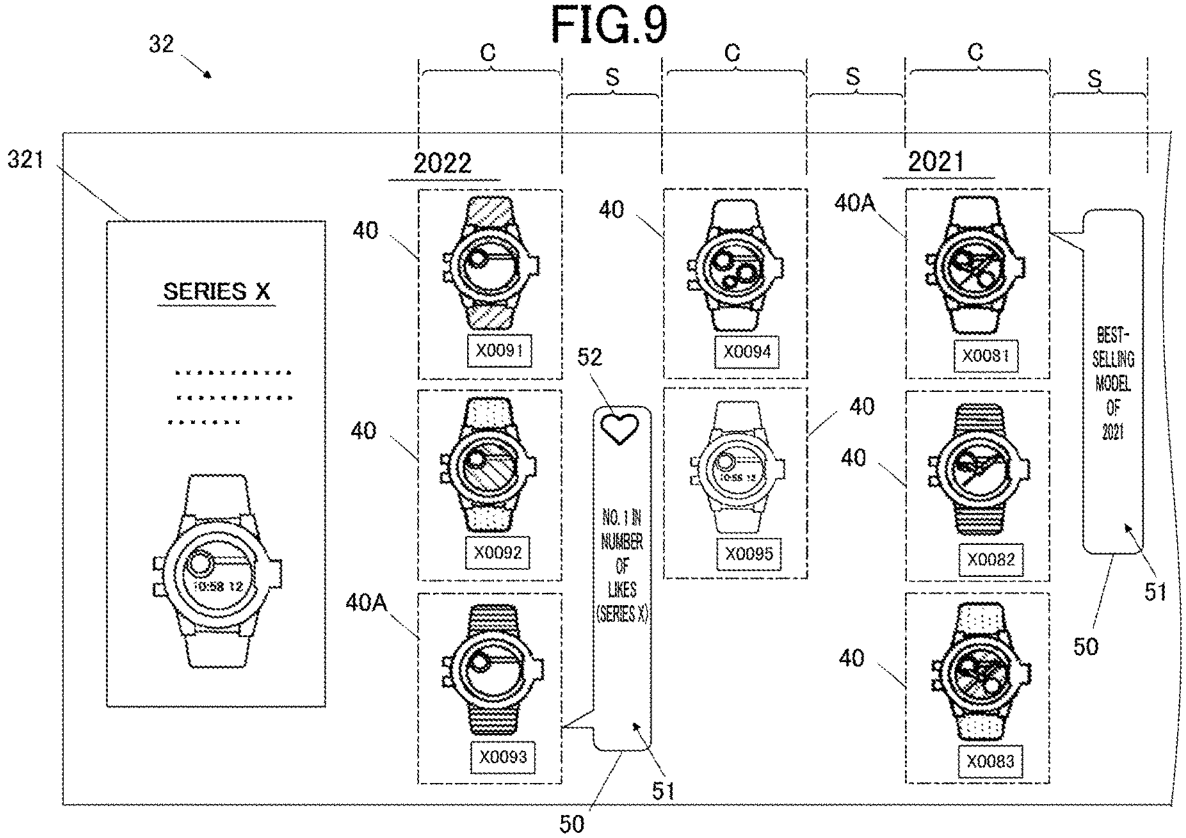
FIG. 9 shows a horizontally scrollable list screen.

FIG. 9 shows the list screen 32 scrollable in the horizontal direction. The list screen 32 shown in FIG. 9 includes information having the same contents as the list screen 32 shown in FIG. 8. On the list screen 32 shown in FIG. 9, the plurality of product images 40 is arranged to form a plurality of columns C. Although three columns C are shown in FIG. 9, the arrangement of the product images 40 is set to form several more columns C in the rightward direction of FIG. 9. A user swipe operation rightward/leftward in FIG. 9 can scroll the screen to the right/left to display product images 40 not displayed on the screen in FIG. 9. The columns C are spaced at regular intervals in the horizontal direction. In interlinear areas S between adjacent columns C, which are adjacent to one another, the pieces 51 of the supplementary information 51 for the target images 40A are displayed.

The display positions of the supplementary images 50 including the pieces 51 of the supplementary information 51 may be appropriately combined with the scroll direction of the list screen 32. For example, on the vertically scrollable list screen 32 shown in FIG. 8, the supplementary information 51 may be displayed between adjacent columns. As another example, on the horizontally scrollable list screen 32 shown in FIG. 9, the supplementary information 51 may be displayed between adjacent rows.

In the case of Japanese or the like that is writable vertically from top to bottom, the supplementary information 51 may be information written vertically from top to bottom.

FIG. 8 and FIG. 9 each show the list screen 32 displayed when one of the series images 312 in FIG. 7 is selected. Similarly, when one of the color images 313 is selected, the list screen 32 for models available in the selected color is displayed. Also, when one of the model number images 314 is selected, the list screen 32 for models belonging the selected group of model numbers is displayed.

When an operation to select (a piece 51 of) the supplementary information 51 is made on the list screen 32, a screen for presenting the detailed information corresponding to (including) the selected supplementary information 51 is displayed on the display 24. The operation to select the supplementary information 51 may be an operation to select its corresponding supplementary image 50 or icon 52. For example, when the supplementary information 51 as the "A: Ranking Information" for the target image 40A of the model X0093 in FIG. 8 is selected, a ranking screen 33 (shown in FIG. 10) for presenting the ranking information Ic of the detailed information associated with the model X0093 is displayed. As another example, when the supplementary information 51 as the "B: Pickup" for the target image 40A of the model X0081 in FIG. 8 is selected, a model screen 34 (shown in FIG. 11) for presenting the model information Ib of the detailed information associated with the model X0081 is displayed.

Figure 10:
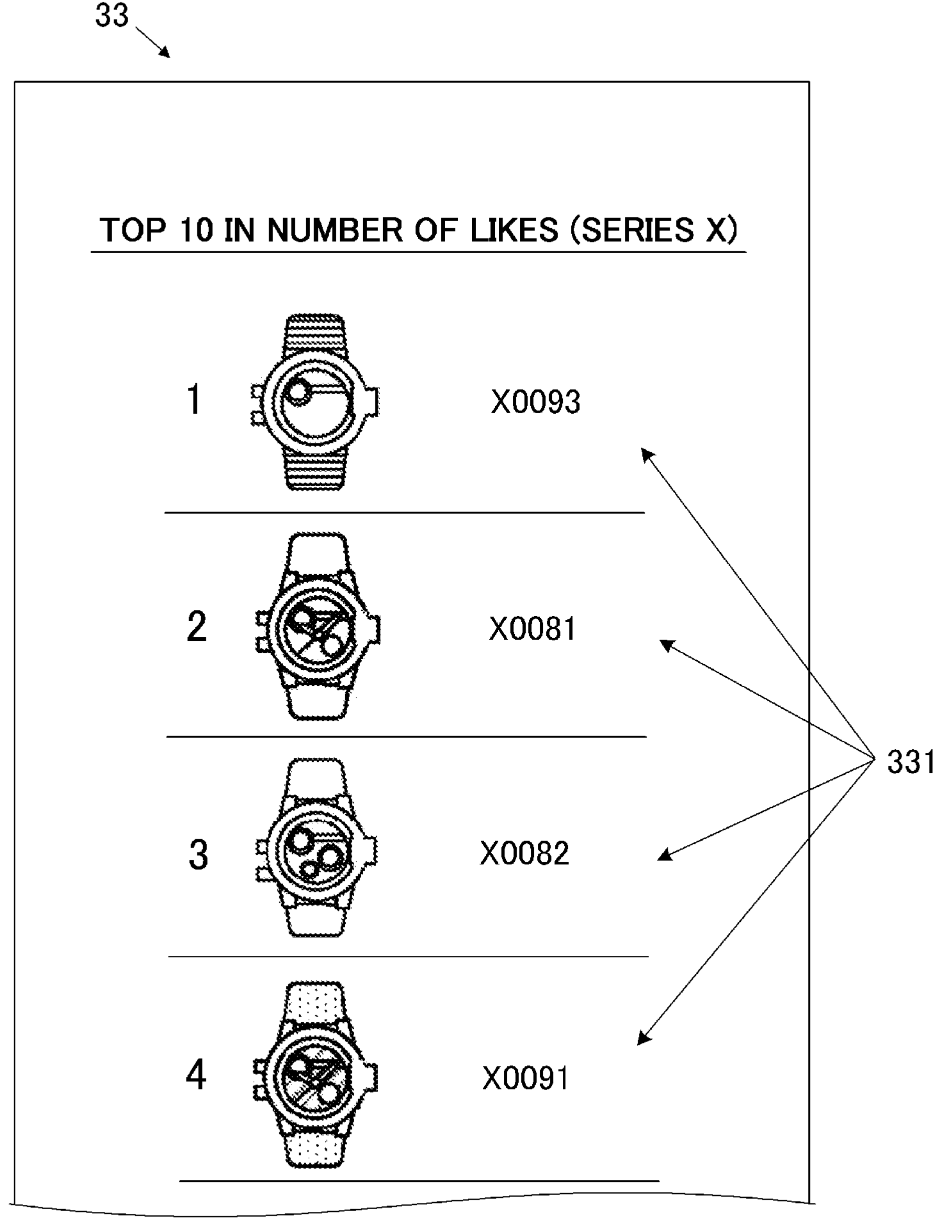
FIG. 10 shows a ranking screen.

FIG. 10 shows the ranking screen 33. The ranking screen 33 in FIG. 10 shows, among the pieces Ic of the ranking information Ic shown in FIG. 5, a ranking of wristwatch models in the number of likes with the series X of wristwatch models as a population. On the ranking screen 33, pieces 331 of rank information 331 indicating ranked wristwatch models are displayed in descending order from the first place. Selecting one of the pieces 331 of the rank information 331 may change the ranking screen 33 to the model screen 34 for a model corresponding to the selected piece 331 of the rank information 331.

Figure 11:
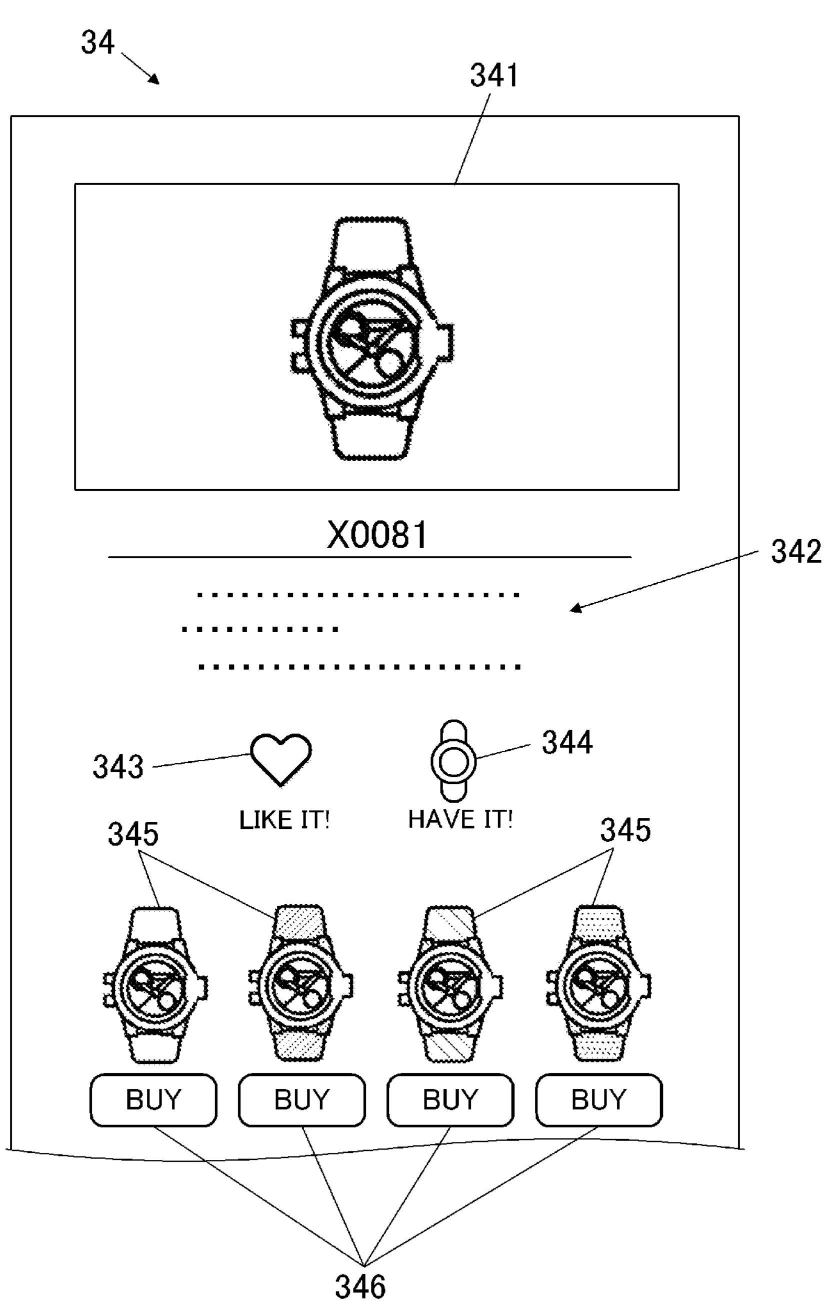
FIG. 11 shows a model screen.

FIG. 11 shows the model screen 34. On the model screen 34, a model representative image 341, a description 342, a like button 343, an own button 344, variation images 345, purchase buttons 346 and so forth are displayed.

The model representative image 341 is an image representative of a model (e.g., an image thereof in a representative color).

The description 342 is a text that describes characteristics of the model in detail. The description 342 is extracted from the "D: Description" of the model information Ib on the model registered in the model DB 2331.

The like button 343 is operated (selected) by the user to mark the model as a like. When the like button 343 is operated, the number of likes for the model increases. In addition, the model that the user has marked as a like may be recorded in the user information Ia on the user registered in the user information DB 132.

The own button 344 is operated (selected) by the user if the user owns (or owned in the past) the model. When the own button 344 is operated, the number of My Watch registrations for the model increases. In addition, the model is recorded in the "My Watch" in the user information Ia on the user registered in the user information DB 132.

The variation images 345 are images of variations (e.g., color variations) of the model.

The purchase buttons 346 are displayed for the variation images 345 on a one-to-one basis. A user operation to select a purchase button 346 starts a process for buying the model of a variation image 345 corresponding to the selected purchase button 346 (e.g., changes the model screen 34 to a purchase screen).

[Display Process]

Next, a display process that is performed by the CPU 21 for performing various types of operation including the above-described display of the supplementary information 51 will be described.

Figure 12:
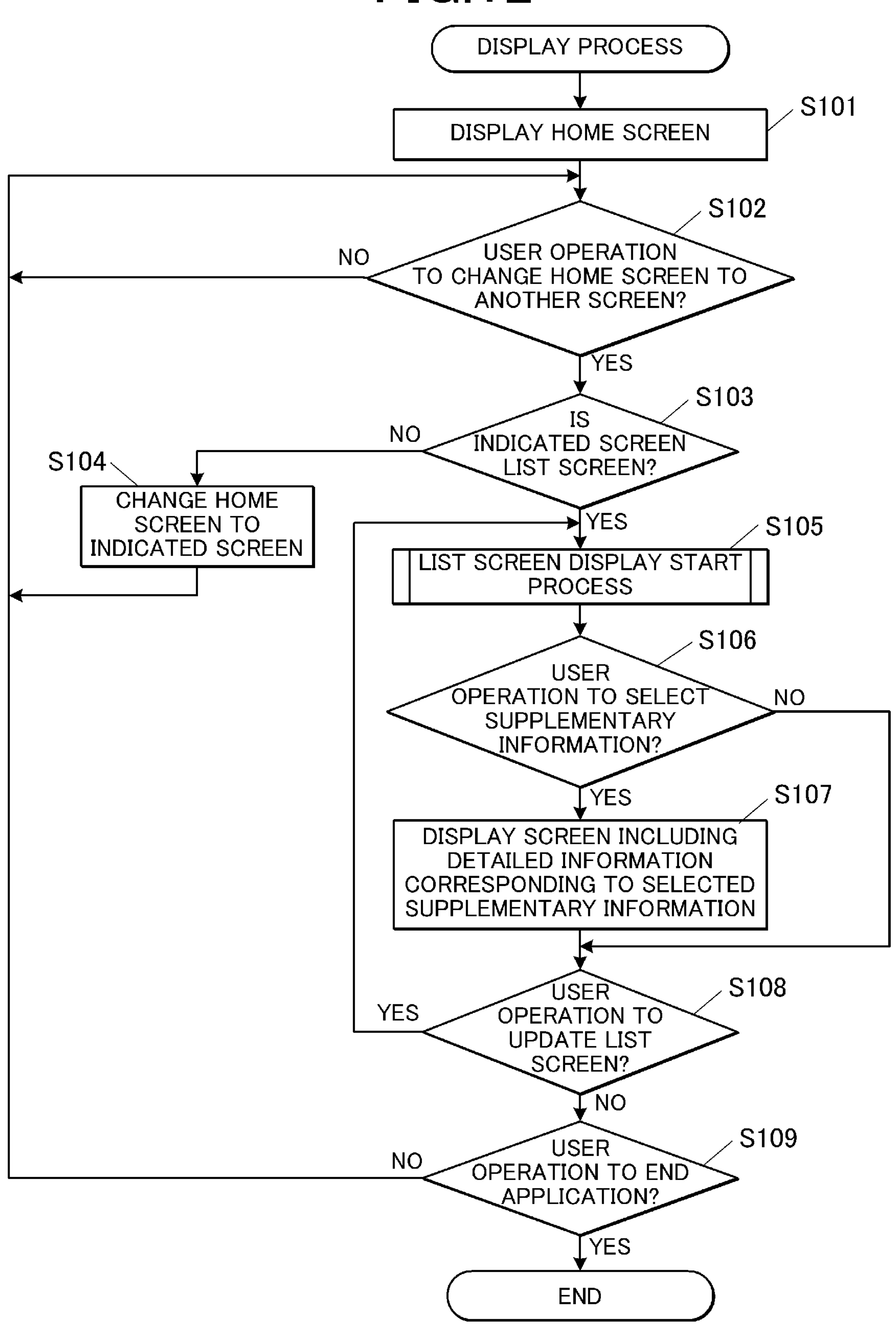
FIG. 12 is a flowchart showing the control procedure of a display process.

FIG. 12 is a flowchart showing the control procedure of the display process. The display process is started when a user operation to start the application 231 is made.

When the display process is started, the CPU 21 causes the display 24 to display the home screen 31 shown in FIG. 7 (Step S101). The CPU 21 determines whether a user operation to instruct the CPU 21 to change the home screen 31 to another screen (indicated screen) has been made (Step S102). If the CPU 21 determines that such a user operation has not been made (Step S102; NO), the CPU 21 repeats Step S102. If the CPU 21 determines that the user operation has been made (Step S102; YES), the CPU 21 determines whether the indicated screen is the list screen 32 (Step S103). If the CPU 21 determines that the indicated screen is not the list screen 32 (Step S103; NO), the CPU 21 causes the display 24 to display the indicated screen (Step S104) and returns the process to Step S102. If the CPU 21 determines that the indicated screen is the list screen 32 (Step S103; YES), the CPU 21 performs a list screen display start process (Step S105).

Figure 13:
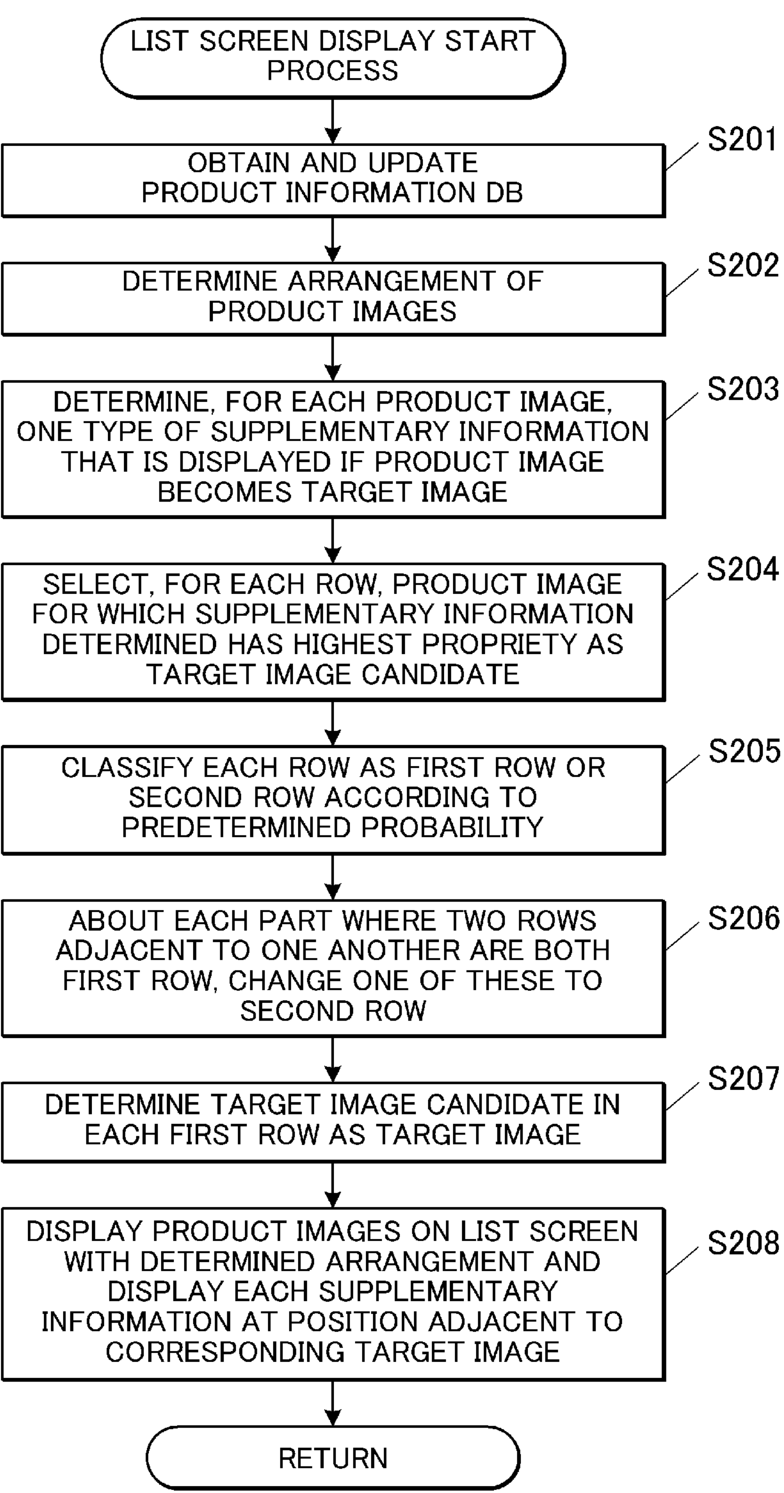
FIG. 13 is a flowchart showing the control procedure of a list screen display start process.

FIG. 13 is a flowchart showing the control procedure of the list screen display start process. When the list screen display start process is called, the CPU 21 obtains the product information DB 133 from the server 10 to update the product information DB 233 stored in the storage 23 to the latest contents (Step S201). In Step S201, the CPU 21 may also obtain the user information Ia for the terminal apparatus 20 registered in the user information DB 132 from the server 10 to update the contents of the user information DB 232.

The CPU 21 determines the arrangement of a plurality of product images 40 on the list screen 32 in accordance with the contents of the user operation determined to have been made in Step S102 (Step S202). For example, if the list screen 32 for the series X shown in FIG. 8 is to be displayed, the CPU 21 determines the arrangement of the plurality of product images 40 to put product images 40 of models belonging to the series X in the order of year of release.

The CPU 21 determines, for each product image 40, one type of the supplementary information 51 that is displayed if the product image 40 becomes the target image 40A (Step S203). More specifically, the CPU 21 determines, for each product image 40, one type of the supplementary information 51 on the basis of priorities and weights preset for the four types "A" to "D" of the supplementary information 51.

Figures 14, 15:
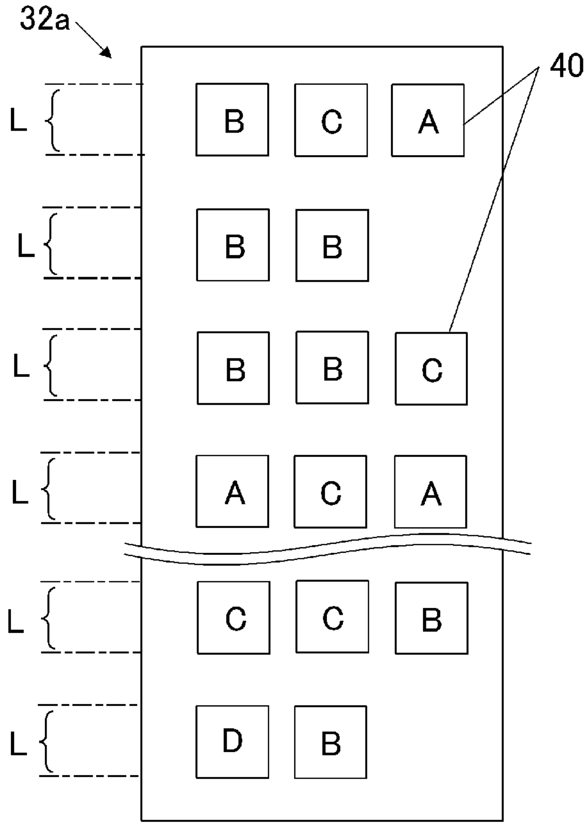
FIG. 14 shows an example of priorities and weights set for respective types of supplementary information.
FIG. 15 shows a state in which one type of the supplementary information has been determined for each product image.

FIG. 14 shows an example of the priorities and weights set for the four types of the supplementary information 51. As shown in FIG. 14, the order of priority of the four types of the supplementary information 51 is in descending order of "A", "B", "C" and "D". In addition, the four types "A" to "D" of the supplementary information 51 are weighted according to the order of priority. In the example shown in FIG. 14, the weights for "A", "B", "C" and "D" are 3.0, 1.5, 1.0 and 0.5, respectively. These priorities and weights are set and stored in the storage 23 in advance. The priorities and/or weights of the four types of the supplementary information 51 may be changed by a user operation (s).

The CPU 21 determines, for each product image 40, one type of the supplementary information 51 from "A" to "D" according to probabilities in which the respective weights are reflected (probabilities corresponding to the respective priorities). For example, the probability of "A", for which the weight is 3.0, is $3/(3+1.5+1+0.5)=1/2$. Further, the probability of "B", for which the weight is 1.5, is $1.5/(3+1.5+1+0.5)=1/4$. Still further, the probability of "C", for which the weight is 1.0, is $1/(3+1.5+1+0.5)=1/6$. Yet further, the probability of "D", for which the weight is 0.5, is $0.5/(3+1.5+1+0.5)=1/12$. That is, the probabilities of the type of the supplementary information 51 to be displayed for a product image 41 being determined to be "A", "B", "C" and "D" are ½, ¼, ⅙ and 1/12, respectively.

If one or more of the types "A" to "D" of the supplementary information 51 are not set in the model information Ib associated with a product image 40, probabilities of types of the supplementary information set for the product image 40 are derived according to the weights shown in FIG. 14 such that the sum of the probabilities becomes 1. For example, about a product image 40 for which only "B" and "D" of the supplementary information 51 are set, probabilities of the type of the supplementary information 51 to be displayed for the product image 40 being determined to be "B" and "D" are ¾ and ¼, respectively.

FIG. 15 shows a state in which one type of the supplementary information 51 has been determined for each product image 40. In Step S203, the display 24 does not display the list screen 32 yet, but FIG. 15 shows, for convenience of explanation, a hypothetical list screen 32*a* based on the assumption that the product images 40 are displayed with the arrangement determined in Step S202. The same applies to FIG. 16 and FIG. 17. On the hypothetical list screen 32*a*, squares represent the product images 40, and "A", "B", "C" or "D" in each product image 40 represents one type of the supplementary information 51 determined for the product image 40.

About each product image 40 for which the type of the supplementary information 51 to be displayed has been determined to be the "A: Ranking Information", if two or more pieces 51 of the type A of the supplementary information 51 are registered in the model information Ib on the model of the product image 40, the CPU 21 selects one piece 51 of the type A of the supplementary information 51. For example, if the supplementary information 51 extracted from the ranking information Ic based on a statistical indicator combined with an attribute of the user information Ia is present, the CPU 21 may select this supplementary information 51. If the "Age Group" is used as the attribute of the user, only an age group to which the user's age belongs may be used, or age groups before and after the user's age group (e.g., 10s and 30s if the user is in his/her 20s) may also be used. For example, if the user's age group is 20s, and the model information Ib includes the supplementary information 51 that is "No. 1 in Number of Likes (30s)", the CPU 21 may select this supplementary information 51 as the supplementary information 51 fit for the attribute of the user. The process of selecting one piece 51 from two or more pieces 51 of the type A of the supplementary information 51 may be performed at a timing other than Step S203, such as at the timing of Step S201, in which the CPU 21 updates the product information DB 233.

The method of determining one type of the supplementary information 51 for each product image 40 is not limited to the above. For example, the CPU 21 may simply determine, for each product image 40, one type of the supplementary information 51 having the highest priority. Alternatively, the CPU 21 may determine, for each product image 40, one type of the supplementary information 51 at random.

Figure 16:
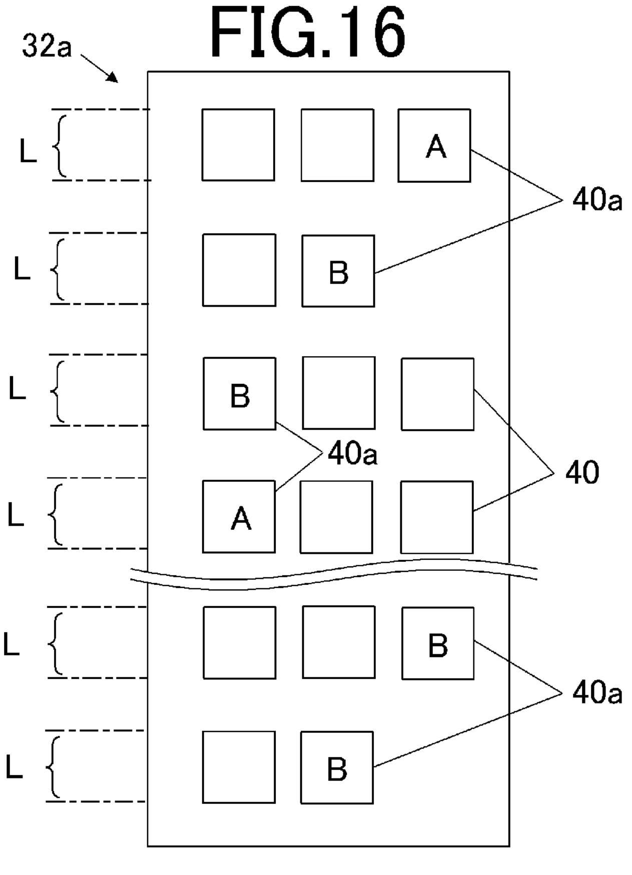
FIG. 16 shows a state in which one target image candidate has been selected for each row.

Returning to FIG. 13, the CPU 21 selects, for each row L, one product image 40 for which the supplementary information 51 determined has the highest priority among the product images 40 in the row L as a target image candidate 40*a*, which is a candidate for the target image 40A (Step S204). This can make the maximum number of the target images 40A included in one row L one. For example, in the first row L in FIG. 15, types of the supplementary information 51 determined for three product images 40 are "B", "C" and "A", respectively, from the left. The CPU 21 therefore selects, as the target image candidate 40*a*, the rightmost product image 40 for which "A" determined has the highest priority among these. As another example, in the third row L, types of the supplementary information 51 determined for three product images 40 are "B", "B" and "C", respectively, from the left. Since there are two product images 40 for each of which "B" determined has the highest priority among these, the CPU 21 selects one of these two product images 40 as the target image candidate 40*a* with a predetermined method (for example, at random). FIG. 16 shows a state in which one target image candidate 40*a* has been selected for each row L.

Returning to FIG. 13, the CPU 21 classifies each row L as a first row L1 or a second row L2 according to a predetermined probability (Step S205). In this embodiment, the first row L1 is a row where one target image 40A is set (i.e., a row where the target image candidate 40*a* included in the row is determined as the target image 40A). The second row L2 is a row where no target image 40A is set. In Step S205, the CPU 21 classifies each row L as the first row L1 with a probability of α% and as the second row L2 with a probability of (100−α) %. The "α" is set so as to satisfy "$0<\alpha\leq 100$" and stored in the storage 23 in advance. The "α" may be changed by a user operation.

After the classification, about each part where two rows L adjacent to one another are both the first row L1, the CPU 21 changes one of the rows L to the second row L2 (Step S206). That is, the CPU 21 adjusts the result of the classification in Step S205 such that at least one of two rows L adjacent to one another among the plurality of rows L becomes the second row L2 (i.e., such that two or more consecutive rows L are not both or all the first row L1).

Figure 17:
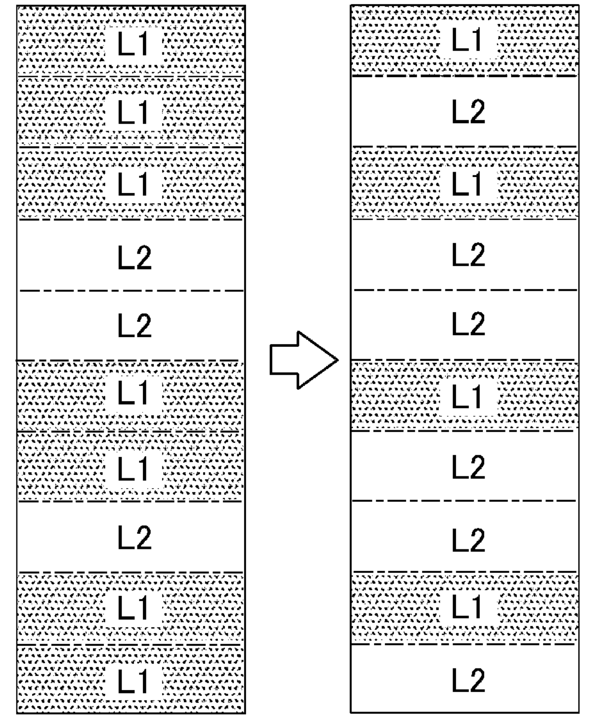
FIG. 17 shows an example of adjustment of classification of the rows.

FIG. 17 shows an example of the adjustment of the classification of the rows L. On the left side in FIG. 17, an example of the result of the classification in Step S205 is shown. In Step S206, the CPU 21 identifies, starting from the top, a combination of two rows adjacent to one another being both the first row L1, and changes one of the first rows L1 (e.g., the lower first row L1 between the two) of the combination to the second row L2. In the example shown on the left side in FIG. 17, the first and second rows, the sixth and seventh rows and the ninth and tenth rows each correspond to the combination of two rows adjacent to one another being both the first row L1. Therefore, as shown on the right side in FIG. 17, the CPU 21 changes each of the second row, the seventh row and the tenth row of the respective combinations to the second row L2.

Returning to FIG. 13, the CPU 21 determines the target image candidate 40*a* in each first row L1 as the target image 40A (Step S207). The CPU 21 does not determine the target image 40A for each row L classified as the second row L2.

The CPU 21 causes the display 24 to display the plurality of product images 40 on the list screen 32 with the arrangement determined in Step S202 and display pieces 51 of the supplementary information 51 at positions adjacent to their respective target images 40A among the plurality of product images 40 (Step S208).

Figure 18:
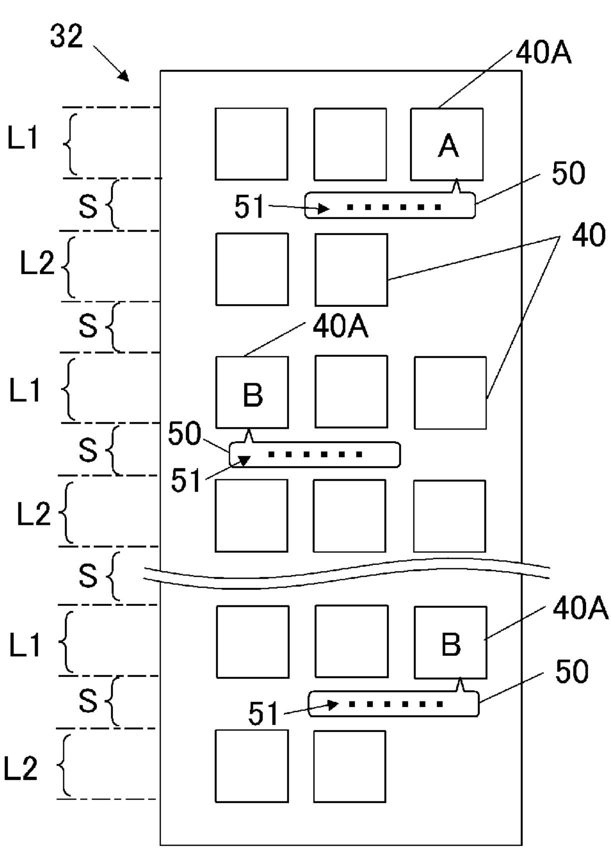
FIG. 18 shows the list screen where the product images and the supplementary information are displayed.

FIG. 18 shows the list screen 32 where the product images 40 and the pieces 51 of the supplementary information 51 are displayed. As shown in FIG. 18, the CPU 21 causes the display 24 to display the supplementary information 51 and the balloon-shaped supplementary image 50 at a position adjacent to the one target image 40A determined in each first row L1 (in the interlinear area S under each first row L1). The CPU 21 does not cause the display 24 to display the supplementary information 51 and the supplementary image 50 in the interlinear area S under each second row L2 where no target image 40A is set. Returning to FIG. 13, after Step S208, the CPU 21 ends the list screen display start process and returns the process to the display process shown in FIG. 12.

The list screen display start process shown in FIG. 13 is an example, and therefore the list screen display start process is not limited thereto. For example, Steps S203, S204 may be omitted, and after Steps S205, S206, in which the CPU 21 determines the first rows L1, the CPU 21 may determine, in Step S207, the target image 40A from three or less product images 40 in each first row L1 with a predetermined method. Examples of the predetermined method include a method of determining the target image 40A at random and a method of determining the target image 40A on the basis of viewing records in the user information Ia by giving the product images 40 of models with no viewing records by the user priority over the product images 40 of models with viewing records by the user. After determining the target image 40A, the CPU 21 may determine the type of the supplementary information 51 to be displayed for the target image 40A with the same method as in Step S203.

Returning to FIG. 12, after ending the list screen display start process (Step S105), the CPU 21 determines whether a user operation to select one of the displayed pieces 51 of the supplementary information 51 has been made (Step S106). If the CPU 21 determines that the user operation has been made (Step S106; YES), the CPU 21 causes the display 24 to display a screen for presenting the detailed information corresponding to the selected supplementary information 51 (Step S107). For example, if the selected supplementary information 51 is the "A: Ranking Information" or the "C: Number of My Watch Registrations", the CPU 21 causes the display 24 to display the ranking screen 33 for the ranking information Ic from which the selected supplementary information 51 has been extracted. As another if example, the selected supplementary information 51 is the "B: Pickup" or the "D: Description", the CPU 21 causes the display 24 to display the model screen 34 for the model information Ib from which the selected supplementary information 51 has been extracted. The CPU 21 may cause the display 24 to display the model screen 34 even if the selected supplementary information 51 is "A" or "C".

After Step S107 or "NO" in Step S106, the CPU 21 determines whether a user operation to update the list screen 32 has been made (Step S108). This user operation may be an operation of pulling the list screen 32 downward (Pull to Refresh) with the top of the list screen 32 displayed. If the CPU 21 determines that the user operation has been made (Step S108; YES), the CPU 21 returns the process to Step S105. The list screen display start process that is performed at this time includes reupdating the product information DB 233 to the latest contents (Step S201), redetermining one type of the supplementary information 51 for each product image 40 (Step S203), redetermining the target image 40A (Steps S205 to S207), and causing the display 24 to display the redetermined supplementary information 51 on the list screen 32 (Step S208).

If the CPU 21 determines that the user operation to update the list screen 32 has not been made (Step S108; NO), the CPU 21 determines whether a user operation to end the application 231 has been made (Step S109). If the CPU 21 determines that such a user operation has not been made (Step S109; NO), the CPU 21 returns the process to Step S102. If the CPU 21 determines that the user operation has been made (S109; YES), the CPU 21 ends the display process and ends the application 231.

Advantageous Effects

The conventional technique displays only images of items on a list screen. This sometimes causes a situation where hints for a user to select a desired item is insufficient. For example, even if there is an item that would normally be of interest to the user, if the user does not recognize it from an image thereof on the list screen, the user will not select the item. Thus, the conventional technique has a problem that images on the list screen less likely to attract the user to items of the images.

To deal with the problem or the like, the display control method of this embodiment is performed by the CPU 21. The CPU 21 determines, in accordance with predetermined rule, from among a plurality of product images 40 (i) each associated with detailed information to be presented to a user and (ii) arranged and displayed on the list screen 32, a target image (s) 40A for which the supplementary information 51 included in the detailed information is to be displayed, causes the display 24 to display the list screen 32 where the plurality of product images 40 is arranged, and causes the display 24 to display, at a position on the list screen 32, the supplementary information 51 having a content related to the detailed information associated with the target image 40A, the position corresponding to the target image 40A. Displaying (pieces 51 of) the supplementary information 51 is likely to attract the user to models of the product images 40 displayed on the list screen 32. This makes it easier to direct the user to the detailed information associated with a model (model screen 34, etc.) and also lets the user know more products.

Further, in response to a user operation to select the supplementary information 51 displayed on the list screen 32, the CPU 21 causes the display 24 to display a screen (model 34 or ranking screen 33) for presenting the detailed information including the supplementary information 51. An intuitive user operation to select the supplementary information 51 enables the display 24 to display the detailed information associated with a model.

Further, the CPU 21 determines the target image (s) 40A such that the ratio of the number of the target image (s) 40A to the number of the plurality of product images 40 is equal to or less than a reference ratio of less than 1. Keeping the amount of the supplementary information 51 to be displayed at a certain amount or less can make the supplementary information 51 easily visible and prominent. Further, the above enables the display 24 to display the supplementary information 51 while maintaining the perspicuity of the product images 40 (maintaining a certain number or more of product images 40 visible without scrolling).

Further, the CPU 21 causes the display 24 to arrange and display the plurality of product images 40 so as to form a plurality of rows L on the list screen 32, causes the display 24 to display the supplementary information 51 in the interlinear area(s) S between adjacent rows L, which are adjacent to one another, among the plurality of rows L, and determines the target image (s) 40A such that the number of the target image (s) 40A included in each of the plurality of rows L is one at maximum. This can make the supplementary information 51 more visible and prominent.

Further, the CPU 21 classifies each of the plurality of rows L as the first row L1 or the second row L2 according to a predetermined probability, adjusts the result of the classification such that at least one of two adjacent rows L, which are adjacent to one another, among the plurality of rows L becomes the second row L2, determines, for each row L classified as the first row L1 after the adjustment, one product image 40 as the target image 40A from among one or more product images 40 arranged in the row L, and does not determine the target image 40A for each row L classified as the second row L2 after the adjustment. This eliminates a situation where (pieces 51 of) the supplementary information 51 is displayed in consecutive rows L and accordingly can make the supplementary information 51 even more visible and prominent.

Further, the detailed information associated with each of the plurality of product images 40 includes at least one type of the supplementary information 51 among a plurality of types of the supplementary information 51 with respective priorities set, and the CPU 21 causes the display 24 to display, among the at least one type of the supplementary information 51 included in the detailed information associated with the target image 40A, one type of the supplementary information 51 on the list screen 32, the one type being determined according to probabilities corresponding to the respective priorities. This makes it likely to display (the type of) the supplementary information 51 with a higher priority.

Further, the CPU 21 determines, for each of the plurality of product images 40, one type of the supplementary information 51 according to the probabilities from among the at least one type of the supplementary information 51 included in the detailed information associated with each of the plurality of product images 40, causes the display 24 to arrange and display the plurality of product images 40 so as to form a plurality of rows L on the list screen 32, and determines, for each row L of the plurality of rows L, one product image 40 at maximum as the target image 40A from among at least one product image 40 for which the one type of the supplementary information 51 determined has the highest priority among one or more product images 40 arranged in the row L. This makes it possible to determine one target image 40A at maximum for each row L while making it likely to display (the type of) the supplementary information 51 with a higher priority.

Further, the CPU 21 redetermines, for each of the plurality of product images 40, one type of the supplementary information 51 according to the probabilities each time the list screen 32 is displayed, and causes the display 24 to display the supplementary information 51 with the result of the redetermination reflected. This makes it possible to display different pieces/types of the supplementary information 51 for different product images 40 each time the list screen 32 is updated and accordingly can attract the user to more models.

Further, each of the plurality of product images 40 is an image of a model among a plurality of wristwatch models in the product information DB 133, the detailed information associated with each of the plurality of product images 40 includes at least one of the ranking information Ic with at least part of the plurality of models as a population and the model information Ib that describes the model of the image, and the supplementary information 51 has a content related to the ranking information Ic or the model information Ib. This makes it possible to display a content (s) of the ranking information Ic or the model information Ib as the supplementary information 51.

Further, the supplementary information 51 may have a content related to the ranking information Ic based on a statistical indicator combined with an attribute of the user. This makes it possible to display the ranking information Ic in which the user is likely to be interested as the supplementary information 51. Alternatively, the supplementary information 51 may have a content related to the ranking information Ic with part of the plurality of wristwatch models as a population, the part having an attribute corresponding to an attribute of the model of the target image 40A. This increases a possibility that the model of each product image 40 is in one or more rankings. Thus, the supplementary information 51 having a content related to the ranking information Ic is likely to be displayed. This can attract user's interest.

Further, the CPU 21 may determine the target image (s) 40A by giving, among the plurality of product images 40, a product image (s) 40 with no viewing record of the user having viewed the detailed information associated with the product image 40 priority over a product image (s) 40 with a viewing record of the user having viewed the detailed information associated with the product image 40. This can easily direct the user to the detailed information associated with a model (s) that the user has not viewed yet.

Further, the terminal apparatus 20 of this embodiment includes the CPU 21, and the CPU 21 performs the display control method described above. Further, the storage 23 of this embodiment is a non-transitory computer-readable storage medium storing the application 231 executable by the CPU 21. The application 231 stored in the storage 23 causes the CPU 21 to perform the processes (steps) of the display control method described above. These are likely to attract the user to models of the product images 40.

[Others]

The present disclosure is not limited to the above-described embodiment and can be modified in a variety of respects.

For example, at least some of the processes (steps) that are performed by the CPU 21 of the terminal apparatus 20 may be performed by the CPU 11 of the server 10. For example, the CPU 11 of the server 10 may perform one or more of the process of determining one type of the supplementary information 51 for each product image 40, the process of determining the first row (s) L1, and the process of determining the target image (s) 40A. In this case, the CPU 11 or the combination of the CPU 11 and the CPU 21 corresponds to "at least one processor".

For example, the CPU 11 (at least one first processor) of the server 10 (information processing apparatus) may determine one type of the supplementary information 51 for each product image 40, determine the first row (s) L1, determine the target image (s) 40A, and transmit information on the determined target image (s) 40A to the terminal apparatus 20 that is an external apparatus. The CPU 11 performs these processes (steps) by executing the program(s) 131 (first program) stored in the storage 13 (first memory). In this case, on the basis of the received information on the target image (s) 40A, the CPU 21 (at least one second processor) of the terminal apparatus 20 causes the display 24 to display the plurality of product images 40 on the list screen 32 and to display the supplementary image (s) 50 at a position (s) on the list screen 32, the position(s) corresponding to the target image (s) 40A. The CPU 21 performs these processes (steps) by executing the application 231 (second program) stored in the storage 23 (second memory).

An apparatus other than the server 10 and the terminal apparatus 20 may perform one or more of the process of determining one type of the supplementary information 51 for each product image 40, the process of determining the first row (s) L1, and the process of determining the target image (s) 40A.

Further, in addition to or instead of the product information DB 133 on products, the information processing system 1 may manage another database (s) such as a database of objects as items. Accordingly, the images arranged and displayed on the list screen 32 are not limited to the product images 40 and may be images of other items. For example, the information processing system 1 may manage a database of a picture book to learn, and the images displayed on the list screen 32 may be images of items included in the picture book.

In the above, the computer-readable storage medium storing the program (application 231) according to the present disclosure is the flash memory of the storage 23, but not limited thereto. As the computer-readable storage medium, an information storage medium, such as an HDD, an SSD or a CD-ROM, can be used. Further, as a medium to provide data of the program (s) according to the present disclosure via a communication line, a carrier wave can be used.

It is a matter of course that the detailed configuration and operation of each component of the information processing system 1 of the above embodiment can be changed appropriately without departing from the scope of the present disclosure.

Although one or more embodiments of the present disclosure have been described above, the present disclosure is not limited thereto, and includes the scope of claims below and the scope of their equivalents.

The invention claimed is:

1. A display control method that is performed by at least one processor of a computer including a memory storing a program that is executed by the processor, comprising:

causing a display to display a list screen where a plurality of images is arranged to form a plurality of lines that is vertical or horizontal, wherein each of the plurality of images is associated with detailed information to be presented to a user;

classifying each of the plurality of lines as a first line or a second line according to a predetermined probability to form one or more first lines and one or more second lines;

changing one of two adjacent lines to the second line if the two adjacent lines are both classified as first lines;

determining a target image from among one or more images arranged in a line classified as the first line, wherein the target image comprises supplementary information to be displayed, the supplementary information being included in the detailed information; and causing the display to display, at a position on the list screen, the supplementary information having a content related to the detailed information associated with the target image, the position corresponding to the target image.

2. The display control method according to claim 1, further comprising, in response to a user operation to select the supplementary information displayed on the list screen, causing the display to display a screen for presenting the detailed information including the supplementary information.

3. The display control method according to claim 1, wherein the step of determining the target image includes determining the target image such that a ratio of a number of the target image to a number of the plurality of images is equal to or less than a reference ratio of less than 1.

4. The display control method according to claim 1, wherein the step of causing the display to display the supplementary information includes causing the display to display the supplementary information between adjacent lines, which are adjacent to one another, among the plurality of lines, and wherein the step of determining the target image includes determining the target image such that a number of the target image included in each of the plurality of lines is one at maximum.

5. The display control method according to claim 4, wherein the step of determining the target image includes:

for each line classified as the second line after the step of changing one of two adjacent lines to the second line, not determining the target image.

6. The display control method according to claim 1, wherein the detailed information associated with each of the plurality of images includes at least one type of the supplementary information among a plurality of types of the supplementary information with respective priorities, and wherein the step of causing the display to display the supplementary information includes causing the display to display, among the at least one type of the supplementary information included in the detailed information associated with the target image, one type of the supplementary information on the list screen, the one type being determined according to probabilities calculated based on weights associated with the respective priorities.

7. The display control method according to claim 6, further comprising:

determining, for each of the plurality of images, one type of the supplementary information according to the probabilities from among the at least one type of the supplementary information included in the detailed information associated with each of the plurality of images, wherein the step of determining the target image include determining, for each first line of the plurality of lines, one image at maximum as the target image from among at least one image for which the one type of the supplementary information determined has a highest priority among one or more images arranged in the first line.

8. The display control method according to claim 7, further comprising:

redetermining, for each of the plurality of images, one type of the supplementary information according to the probabilities each time the list screen is displayed; and causing the display to display the supplementary information with a result of the redetermination reflected.

9. The display control method according to claim 6, further comprising:

redetermining, for each of the plurality of images, one type of the supplementary information according to the probabilities each time the list screen is displayed; and causing the display to display the supplementary information with a result of the redetermination reflected.

10. The display control method according to claim 1, wherein each of the plurality of images is an image of an item among a plurality of items in a predetermined database, wherein the detailed information associated with each of the plurality of images includes at least one of: statistical information with at least part of the plurality of items as a population; and item information that describes the item of the image, and wherein the supplementary information has a content related to the statistical information or the item information.

11. The display control method according to claim 10, wherein the statistical information is statistical information based on a statistical indicator combined with an attribute of the user or statistical information with part of the plurality of items as a population, the part having an attribute corresponding to an attribute of the item of the target image.

12. The display control method according to claim 1, wherein the step of determining the target image includes determining the target image by giving, among the plurality of images, an image with no viewing record of the user having viewed the detailed information associated with the image priority over an image with a viewing record of the user having viewed the detailed information associated with the image.

13. The display control method according to claim 1, wherein each of the plurality of lines is classified as the first line with a probability of $\alpha$ % and as the second line with a probability of $(100-\alpha)$ %, wherein $0<\alpha\geq 100$.

14. A display control apparatus comprising:

a memory storing a program;

at least one processor executing the program; and a display, wherein the processor is configured to:

cause the display to display a list screen where a plurality of images is arranged to form a plurality of lines that is vertical or horizontal, wherein each of the plurality of images is associated with detailed information to be presented to a user;

classify each of the plurality of lines as a first line or a second line according to a predetermined probability to form one or more first lines and one or more second lines;

change one of two adjacent lines to the second line if the two adjacent lines are both classified as first lines;

determine a target image from among one or more images arranged in a line classified as the first line, wherein the target image comprises supplementary information to be displayed, the supplementary information being included in the detailed information; and cause the display to display, at a position on the list screen, the supplementary information having a content related to the detailed information associated with the target image, the position corresponding to the target image.

15. An information processing apparatus comprising:

a memory storing a program; and at least one processor executing the program, wherein the processor is configured to:

arrange a plurality of images on a list screen to form a plurality of lines that is vertical or horizontal, wherein each of the plurality of images is associated with detailed information to be presented to a user;

classify each of the plurality of lines as a first line or a second line according to a predetermined probability to form one or more first lines and one or more second lines;

change one of two adjacent lines to the second line if the two adjacent lines are both classified as first lines;

determine a target image from among one or more images arranged in a line classified as the first line, wherein the target image comprises supplementary information to be displayed, the supplementary information being included in the detailed information; and transmit information on the target image to an external apparatus for a display of the external apparatus to display, at a position on the list screen, the supplementary information having a content related to the detailed information associated with the target image, the position corresponding to the target image.

16. An information processing system comprising:

an information processing apparatus including a first memory storing a first program and at least one first processor executing the first program; and a display control apparatus including a second memory storing a second program, at least one second processor executing the second program, and a display, wherein the first processor is configured to:

arrange a plurality of images on a list screen to form a plurality of lines that is vertical or horizontal, wherein each of the plurality of images is associated with detailed information to be presented to a user;

classify each of the plurality of lines as a first line or a second line according to a predetermined probability to form one or more first lines and one or more second lines;

change one of two adjacent lines to the second line if the two adjacent lines are both classified as first lines;

determine a target image from among one or more images arranged in a line classified as the first line, wherein the target image comprises supplementary information to be displayed, the supplementary information being included in the detailed information; and transmit information on the target image to the display control apparatus, and wherein the second processor is configured to:

cause the display to display, based on the received information on the target image, the list screen where the plurality of images is arranged, and cause the display to display, at a position on the list screen, the supplementary information having a content related to the detailed information associated with the target image, the position corresponding to the target image.

17. A non-transitory computer-readable storage medium storing a program that causes at least one processor to:

cause a display to display a list screen where a plurality of images is arranged to form a plurality of lines that is vertical or horizontal, wherein each of the plurality of images is associated with detailed information to be presented to a user;

classify each of the plurality of lines as a first line or a second line according to a predetermined probability to form one or more first lines and one or more second lines;

change one of two adjacent lines to the second line if the two adjacent lines are both classified as first lines;

determine a target image from among one or more images arranged in a line classified as the first line, wherein the target image comprises supplementary information to be displayed, the supplementary information being included in the detailed information; and cause the display to display, at a position on the list screen, the supplementary information having a content related to the detailed information associated with the target image, the position corresponding to the target image.

* * * * *